United States Patent [19]
Shirakihara et al.

[11] Patent Number: 5,923,832
[45] Date of Patent: Jul. 13, 1999

[54] METHOD AND APPARATUS FOR CHECKPOINTING IN COMPUTER SYSTEM

[75] Inventors: Toshio Shirakihara; Tatsunori Kanai; Toshiki Kizu, all of Kanagawa-ken, Japan

[73] Assignee: Kabushiki Kaisha Toshiba, Kawasaki, Japan

[21] Appl. No.: 08/818,979

[22] Filed: Mar. 14, 1997

[30] Foreign Application Priority Data

Mar. 15, 1996 [JP] Japan ..................................... 8-059188

[51] Int. Cl.⁶ ..................................................... G06F 11/00
[52] U.S. Cl. ....................................... 395/182.13; 395/569
[58] Field of Search ......................... 395/182.13, 182.14, 395/182.15, 182.17, 182.18, 569, 185.02, 185.04; 707/202, 204

[56] References Cited

U.S. PATENT DOCUMENTS

| | | | |
|---|---|---|---|
| 4,665,520 | 5/1987 | Strom et al. ................................. | 371/7 |
| 5,271,013 | 12/1993 | Gleeson ............................. | 395/182.18 |
| 5,293,613 | 3/1994 | Hayden et al. ..................... | 395/182.13 |
| 5,301,309 | 4/1994 | Sugano .................................... | 395/575 |
| 5,440,726 | 8/1995 | Fuchs et al. ........................ | 395/182.18 |
| 5,590,277 | 12/1996 | Fuchs et al. ........................ | 395/182.14 |
| 5,630,047 | 5/1997 | Wang .................................. | 395/182.13 |
| 5,664,088 | 9/1997 | Romanovsky et al. ............. | 395/182.11 |
| 5,734,817 | 3/1998 | Roffe et al. ......................... | 395/182.13 |
| 5,802,267 | 9/1998 | Shirakihara ......................... | 395/182.13 |

OTHER PUBLICATIONS

Cristian et al., "A Timestamp Based Checkpointing Protocol for Long Lived Distributed Computations", Reliable Distributed Systems, 10th Symposium, IEEE, pp. 12–20, 1991.

Silva et al., "Global Checkpointing for Distributed Prgrams", Reliable Distributed systems, 11th Symposium, IEEE, pp. 155–162, 1992.

Silva et al., "On The Optimum Recoevry of Distributed Programs", Euromicro, System Architecture and Design, 20th Conference, IEEE, pp. 704–711, 1994.

Netzer et al., "Necessary and Sufficient Conditions for Consitent Global Snapshots", IEEE Trans. on Parallel and Distributed Sysstems, vol. 6, No. 2 pp. 165–169, 1995.

Chandy, K. Mani et al., "Distributed Snapshots: Determining Global States of Distributed Systems," ACM Transactions on Computer Systems, vol. 3, No. 1, Feb. 1985, pp. 63–75.

Plank, James S. et al., "ickp: A Consistent Checkpointer for Multicomputers," IEEE Parallel & Distributed Technology, pp. 62–67.

Strom, Robert E. et al., "Optimistic Recovery in Distributed Systems," ACM Transactions on Computer Systems, vol. 3, No. 3, Aug. 1985, pp. 204–226.

*Primary Examiner*—Joseph E. Palys
*Attorney, Agent, or Firm*—Finnegan, Henderson, Farabow, Garrett & Dunner, L.L.P.

[57] ABSTRACT

A computer system monitors inter-process communications and performs a synchronous (global) checkpointing for processes that belong to a checkpoint group. The system also performs a local checkpointing at respectively arbitrary times within each process. When a fault occurs, a validity of each checkpoint is examined in accordance with monitoring results of inter-process communications related to the fault process. If the most recent checkpoint of the fault process is valid, only the fault process is rolled back. If it is invalid, all processes of the checkpoint group are rolled back to the global checkpoint, or each of the processes are rolled back to each optimum (valid) checkpoint.

13 Claims, 16 Drawing Sheets

FIG. 1 (a) Prior Art
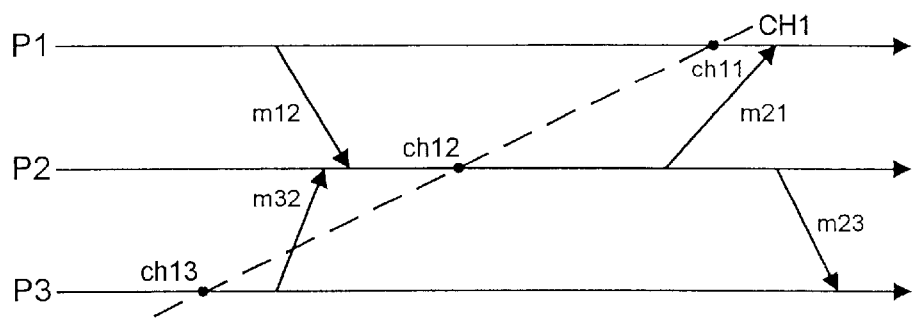
FIG. 1 (b) Prior Art
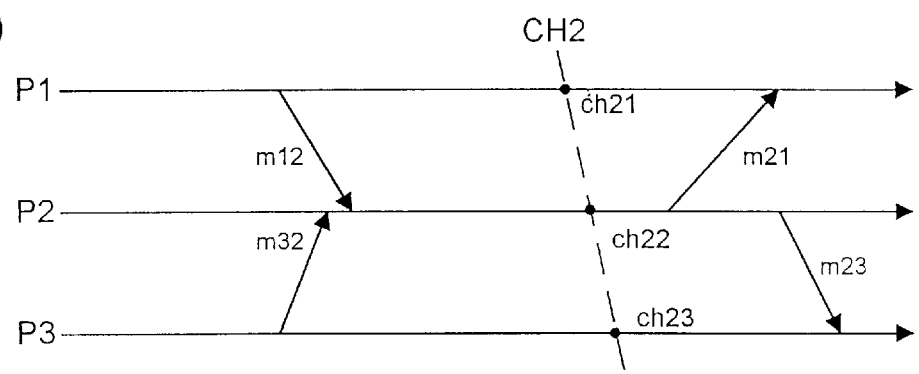
FIG. 1 (c) Prior Art
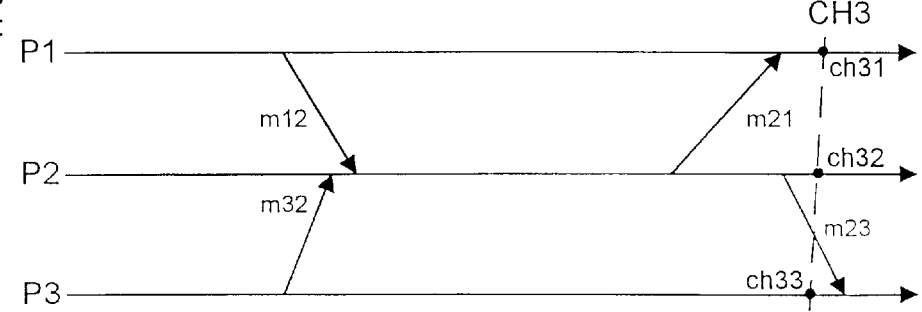

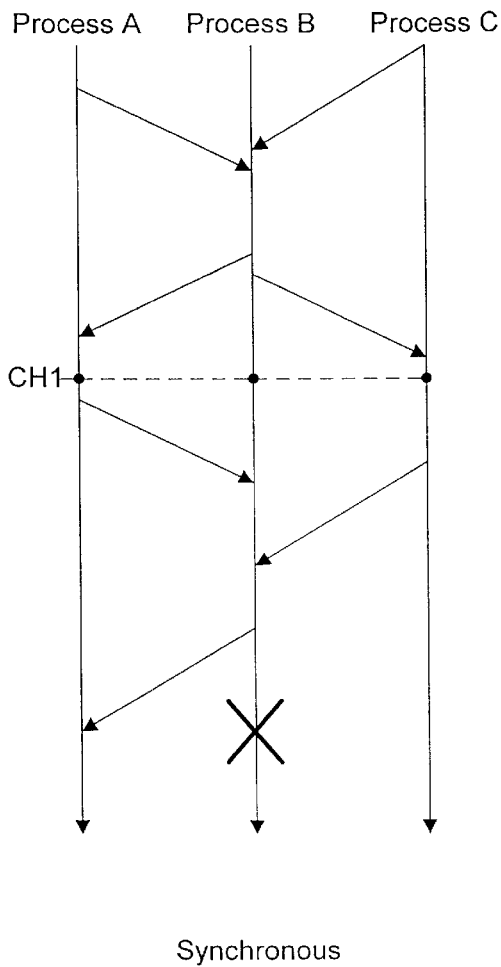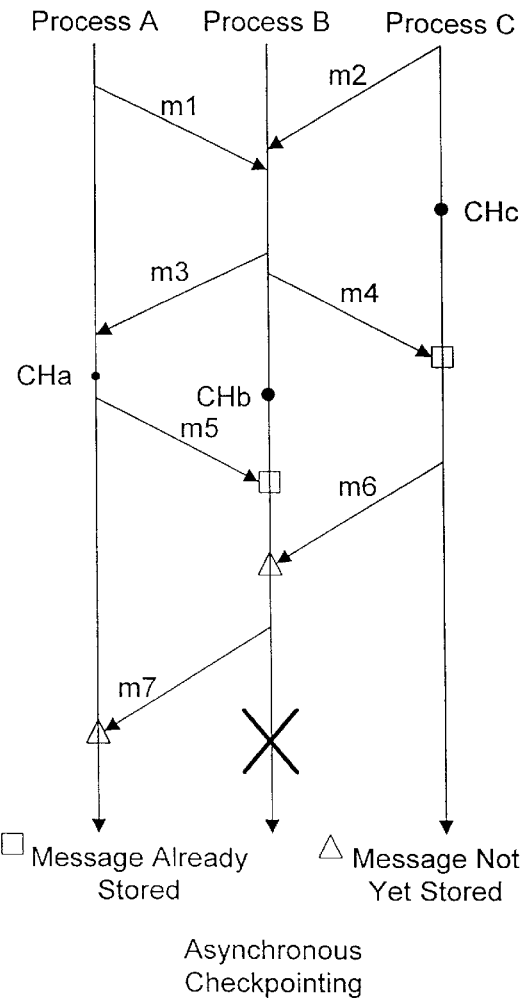
Synchronous Checkpointing
FIG. 2(a) Prior Art
Asynchronous Checkpointing
FIG. 2(b) Prior Art

| Checkpoint Group ID | Process ID | | | |
|---|---|---|---|---|
| 1 | A : 100 | A : 89 | B : 102 | C : 154 |
| 2 | A : 193 | A : 200 | B : 200 | C : 101 |
| . | . | | . | |
| . | . | | . | |
| . | . | | . | |

FIG. 7(a)

| Process P1 | Process P2 | Process P3 | Process P4 | Process P5 |
|---|---|---|---|---|
| GC1 | GC1 | GC1 | GC1 | GC1 |
| ca1 | s ( m3 : P3 ) | r (m3 : P2 ) | r (m9 : P5 ) | s (m9 : P4 ) |
| s(m1 : P2) | r ( m4 : P3 ) | cc1 | cd1 | ce1 |
| ca2 | cb1 | s (m4 : P2 ) | s (m7 : P3 ) | r (m10 : P4 ) |
| r (m2 : P2) | r ( m1 : P1 ) | r (m7 : P4 ) | s (m10 : P5) | ce2 |
| ca3 | s (m2 : P1 ) | s (m8 : P4 ) | r (m8 : P3 ) | s (m11 : P4 ) |
| GC2 | s (m5 : P3 ) | cc2 | r (m11: P5 ) | r (m12 : P4 ) |
| | cb2 | r (m5 : P2 ) | s (m12 : P5) | ce3 |
| | r (m6 : P3 ) | s (m6 : P2) | cd2 | GC2 |
| | GC2 | GC2 | GC2 | |

FIG. 13

METHOD AND APPARATUS FOR CHECKPOINTING IN COMPUTER SYSTEM

BACKGROUND OF THE INVENTION

1. Field of the Invention

The present invention relates to a method and apparatus for checkpointing a plurality of processes operating under a distributed processing environment while carrying out communication between software processes.

2. Description of the Background Art

A conventional method for increasing reliability of program execution for computers is periodic checkpointing of each process. When a fault occurs, a state of the process can be rolled back to a checkpoint before the fault occurred, and the process can be re-executed from that checkpoint state. A checkpoint state is a state of a process during execution of a program, and is stored information necessary for re-execution from that checkpoint. A "checkpoint" refers to a time-point at which re-execution can be commenced when a fault occurs, and "to checkpoint" and "checkpointing" refer to the act of storing the checkpoint state.

In a system where a single process operates or one process operates independently of other processes, it suffices to checkpoint for intermediate states of that process alone. However, in a distributed system in which a plurality of processes operate in parallel while carrying out inter-process communications, it is insufficient to have checkpointed for only the single process where the fault occurred. Thus, it is necessary to checkpoint a plurality of processes that are related to each other by inter-process communications, so that these processes can be re-executed without contradiction.

Hereinafter, a checkpoint generated for an individual process is referred to as a "checkpoint," and a set of checkpoints corresponding to related processes is referred to as a "distributed checkpoint." Also, "fault process" refers to a process to be rolled back because a fault occurred in that process and "non-fault process" refers to a process that is not a "fault process."

For inter-process communications under a distributed environment, message passing and data exchange are available. For data exchange, either using shared memory or file sharing is available. Message passing is a way of exchanging data by synchronizing the message sending process and the message receiving process. Shared memory is a memory shared among a plurality of processes, which can be read or written directly by each process and any other process can view what is written in the shared memory. A file is accessible from a plurality of processes, so a file may facilitate an information exchange.

While message passing is a synchronous inter-process communication, shared memory or shared files are asynchronous inter-process communications. For both types of communications, it is necessary to generate a distributed checkpoint for the set of processes, i.e., for a "checkpoint group," that affect each other in performing inter-process communications.

FIGS. 1(a)–1(c) show examples of three types of distributed checkpoints CH1, CH2, and CH3, respectively, where processing is carried out while each one of three processes P1, P2, and P3, respectively, do message passing. Also, in FIGS. 1(a)–1(c), a symbol "m" indicates a message, and two numbers following "m" indicate an identification number of a message sending process and an identification number of a message receiving process, respectively.

In FIG. 1(a), at CH1, processes P1, P2, and P3 generate checkpoints ch11, ch12, ch13, respectively. Referring to message m32, at ch13, despite the fact that process P3 is in a state of not having sent message m32, process P2 is in a state of already having received message m32 at ch12. Consequently, if re-execution is performed after rollback to distributed checkpoint CH1 upon occurrence of a fault in any process, a contradictory state results for message m32. Similarly, referring to CH3 of FIG. 1(c), a contradictory state is produced for message m23.

In contrast, referring to CH2 of FIG. 1(b), no contradictory state arises for any message, so the rollback and the re-execution can be performed correctly.

There are two types of conventional methods for performing distributed checkpointing: 1) synchronous checkpointing and 2) asynchronous checkpointing. The conventional system can utilize only one of these methods. FIGS. 2(a) and 2(b) show synchronous and asynchronous checkpointing during processing, respectively, while messages are exchanged between three processes A, B, and C.

In a synchronous checkpointing system, checkpointing is performed by synchronizing among processes belonging to a checkpoint group. Specifically, a checkpoint such as CH1 in FIG. 2(a) is generated by producing a condition in which there is no inconsistency caused by inter-process communications among the processes. In a system described in K. M. Chandy and L. Lamport, "Distributed Snapshots: Determined Global States of Distributed Systems," *ACM Trans. Computer Syst.*, Vol. 3, No. 1 (February 1985) at 63–75, messages that would create contradiction are detected by mutually sending messages called markers on distributed checkpoint acquisition. Storing these detected messages creates a consistent condition in order to perform synchronous checkpointing.

Apart from the system proposed by Chandy et al., J. S. Plank and K. Lee propose a scheme for performing local checkpointing by establishing synchronization using a two-phase commit protocol in "ickp: A Consistent Checkpointer for Multicomputers," *IEEE Parallel Distrib. Technol. Syst. Appl.*, Vol. 2, No. 2 (Summer 1994) at 62–67. In this scheme, all related processes are stopped in the first phase and a checkpoint condition with no message-related state is produced for each process. Then, after checkpointing of all of the processes is finished, processing of all the processes is resumed in the second phase.

With the above synchronous-type checkpointing, all the processes are restarted from the checkpoint CH1 when a fault occurs in process B at time-point X in FIG. 2(a). FIG. 3 shows a client-server type processing in which processing requests are issued by a plurality of client processes, C1 and C2, to a server process, S, by message passing. After generating synchronous checkpoint CP1, each process continues processing with message communication. Under these circumstances, if rollback is performed to CP1 because a fault occurs at client C1 at time-point F1, server S rolls back since it was in communication with client C1. Furthermore, C2 must roll back to CP1, since it performed communication with server S. Because a plurality of client processes are usually used by different users in a client-server model system, a fault at a single client node of one user affects other client nodes of many other users.

In an asynchronous checkpointing system, as shown in FIG. 2(b), checkpointing is performed at an arbitrary time in each process. One method of implementing an asynchronous checkpointing system is disclosed in R. E. Strom and S. Yemeni, "Optimistic Recovery in Distributed Systems,"

ACM *Trans. Computer Syst.*, Vol. 30, No. 3, at 204–228 (1985). In FIG. 2(b), if a fault occurs in process B at a time-point indicated by the symbol x, process B rolls back to CHb. Since process B must regenerate messages m5 and m6, processes A and C also roll back to CHa and CHc, respectively. When this happens, m4 has to be regenerated by process C, in turn requiring process B to further roll back to a checkpoint prior to CHb. Such a situation, in which processes are rolled back in a chain, is called "cascade rollback."

In an asynchronous checkpointing system, in order to prevent such a cascade rollback, a scheme called "message logging" is adopted, in which the received messages are stored in each process. Specifically, in FIG. 2(b), messages illustrated with squares are received messages that have been stored, while messages illustrated with triangles are received messages which have not yet been stored.

In FIG. 2(b), if a fault occurs in process B at a time-point indicated by the symbol X, process B restarts from CHb with message m5 stored, so re-execution is possible from the state prior to receipt of message m6. However, as the content of message m6 has been lost, process C is also re-executed from Chc. The step receiving m4 is re-executed using stored m4, and m6 is then transmitted. Execution continues without rollback of process A.

It should be noted that the operation of each process must be determinate, i.e., reproducible. That is, the process produces the same results every time it is executed. In contrast, an indeterminate process may produce a different result depending on repeated execution.

The reason why the process must be determinate is that each process re-executes the receipt of messages using the stored messages. If the operation of any process were indeterminate, there would be a possibility of a message different from the stored received message in the receiving process being generated by the message sending process.

Advantages/disadvantages of synchronous checkpointing and asynchronous checkpointing are listed below.

<<Synchronous checkpointing>>
Restart points can easily be ascertained(advantage).
Operation of each process may be indeterminate (advantage).
Message storing is not necessary (advantage).
When a fault occurs, all the checkpoint groups are rolled back (disadvantage).
<<Asynchronous checkpointing>>
Some of non-fault processes might not need to be rolled back (advantage).
Message storing is necessary requiring greater memory capacity (disadvantage).
If a message has not been stored, the number of processes to be rolled back and the ranges of rollback are increased (disadvantage).
Operation of each process must be determinate, i.e., any indeterminate program cannot be used (disadvantage).

SUMMARY OF THE INVENTION

It is therefore an object of the present invention to provide a scheme for checkpointing that easily ascertains a restart point allowing operations of the processes to be indeterminate, alleviates the need to store received messages and reduces the number of non-fault processes which have to be rolled back.

According to one aspect of the present invention, there is provided a method for checkpointing for a plurality of processes performing inter-process communication, the method comprising the steps: of monitoring the inter-process communication for each of the processes; generating a global checkpoint for each of the processes, synchronizing the checkpointing of the processes; generating a local checkpoint for each of the processes, with a timing determined respectively for each of the processes; and rolling back at least one of the processes to one of the global and local checkpoints based on the monitoring, upon occurrence of a fault.

Also in accordance with the present invention, there is provided a computer system, comprising: means for executing a plurality of processes performing inter-process communication; means for monitoring the inter-process communication for each of the processes; means for generating a global checkpoint for each of the processes, synchronizing the checkpointing of the processes; means for generating a local checkpoint for each of the processes, with a timing determined respectively for each of the processes; and means for rolling back at least one of the processes to one of the global and local checkpoints based on the monitoring, upon occurrence of a fault.

Further in accordance with the present invention, there is provided an article of manufacture, comprising: a computer usable medium having computer readable program code means embodied therein for causing a computer to function as a checkpointing manager for managing checkpointing for a plurality of processes performing inter-process communication, the computer readable program code means including: first computer readable program code means for causing the computer to receive a result of monitoring the inter-process communication for each of the processes; second computer readable program code means for causing the computer to command to generate a global checkpoint for each of the processes, synchronizing the checkpointing of the processes; third computer readable program code means for causing the computer to receive information of a local checkpoint for each of the processes, the local checkpoint being generated with a timing determined respectively for each of the processes; and fourth computer readable program code means for causing the computer to determine to roll back at least one of the processes to one of the global and local checkpoints based on the result of monitoring, upon occurrence of a fault.

Other features and advantages of the present invention will become apparent from the following description taken in conjunction with the accompanying drawings. Both the foregoing general description and the following detailed description provide examples consistent with this invention and explain how to make and use systems and methods consistent with the invention. These description does not restrict the claimed invention.

BRIEF DESCRIPTION OF THE DRAWINGS

FIGS. 1(a)–1(c) are diagrams showing examples of conventional distributed checkpoint timings for message passing;

FIGS. 2(a) and 2(b) are diagrams respectively showing examples of conventional synchronous and asynchronous checkpointing during processing;

FIG. 7(a) shows exemplary checkpoint group information and FIG. 7(b) is a flowchart showing a procedure performed by a checkpoint management section;

FIG. 13 shows an exemplary history of each process stored in a checkpoint group management section;

DETAILED DESCRIPTION OF THE PREFERRED EMBODIMENTS

Figure 3:
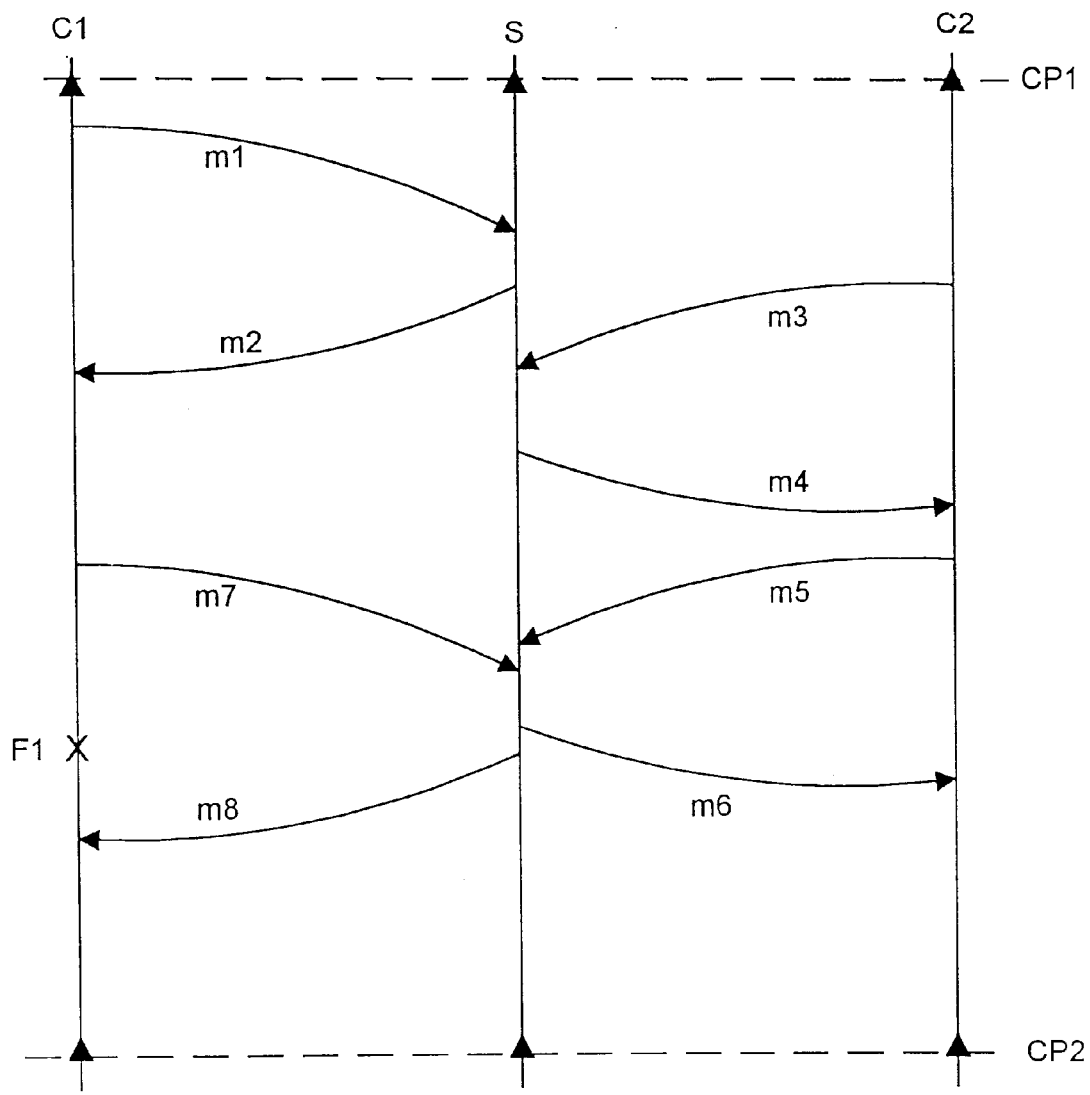
FIG. 3 is a diagram showing a client-server type processing for message passing with conventional synchronous checkpointing.

The preferred embodiments according to the present invention will be described in detail.

A computer system consistent with the present invention monitors inter-process communications and performs synchronous checkpointing among processes which belong to a checkpoint group. The synchronous checkpoint is called a "global checkpoint." The system also performs local checkpointing at arbitrary times within each process, without synchronization. When a fault occurs, the validity of each checkpoint is examined with monitored results of the inter-process communications relating to the fault process. This scheme for checkpointing combines two types of checkpointing, namely, distributed checkpointing using synchronous checkpointing for all processes of the checkpoint group, and local checkpointing within each process. Thus, two different types of checkpoints are generated for each process.

When a fault occurs, the validity of each checkpoint is examined based on whether or not there has been an inter-process communication by going back until the system finds a valid checkpoint. Here, checkpoint "validity" describes whether all matters relating to inter-process communications can be restarted without contradiction when the process is rolled back to the checkpoint. The process to be rolled back could be one or more.

Consequently, if, for example, the fault process has not performed any inter-process communication subsequent to the most recent checkpoint in the fault process, this checkpoint is rendered valid. In this case, it is sufficient to roll back only the fault process to the most recent checkpoint. There is no need to roll back other non-fault processes.

In contrast, if an inter-process communication has taken place, the most recent checkpoint is rendered invalid. In this case, by utilizing the most recent synchronous checkpoint as the restart point for all the processes, all the processes can be restarted without contradiction. Thus, the system can avoid situations such as cascade rollback.

Preferably, the system maintains a record of inter-process communications for each process by monitoring, and manages a record of synchronous and local checkpointing for processes that belong to the checkpoint group. The record of inter-process communications does not need to include contents of messages. In other words, the local checkpointing does not require message logging.

According to this management, based on the record of checkpointing and inter-process communications of its respective processes, it is possible to determine the optimum checkpoint to which each process should be rolled back. Consequently, even if the most recent checkpoint of the fault process is invalid, it is not necessary to roll back all the processes to the distributed checkpoint. Hence, the system minimizes the number of processes to be rolled back and reduces the range of rollback.

For example, only processes that are affected by inter-process communication performed subsequent to the most recent checkpoint in the fault process are rolled back to a valid synchronous or local checkpoint for the respective processes.

It should be noted that, at most, it will be necessary to roll back to the most recent synchronous checkpoint in order to re-execute all the processes without contradiction. Thus, only the most recent record of synchronous checkpointing is necessary for management. Consequently, records need to be maintained only of the most recent synchronous checkpoint and the local checkpoints generated subsequent to the most recent synchronous checkpoint.

A first embodiment of the present invention will now be described referring to FIGS. 4 through 12.

Figure 4:
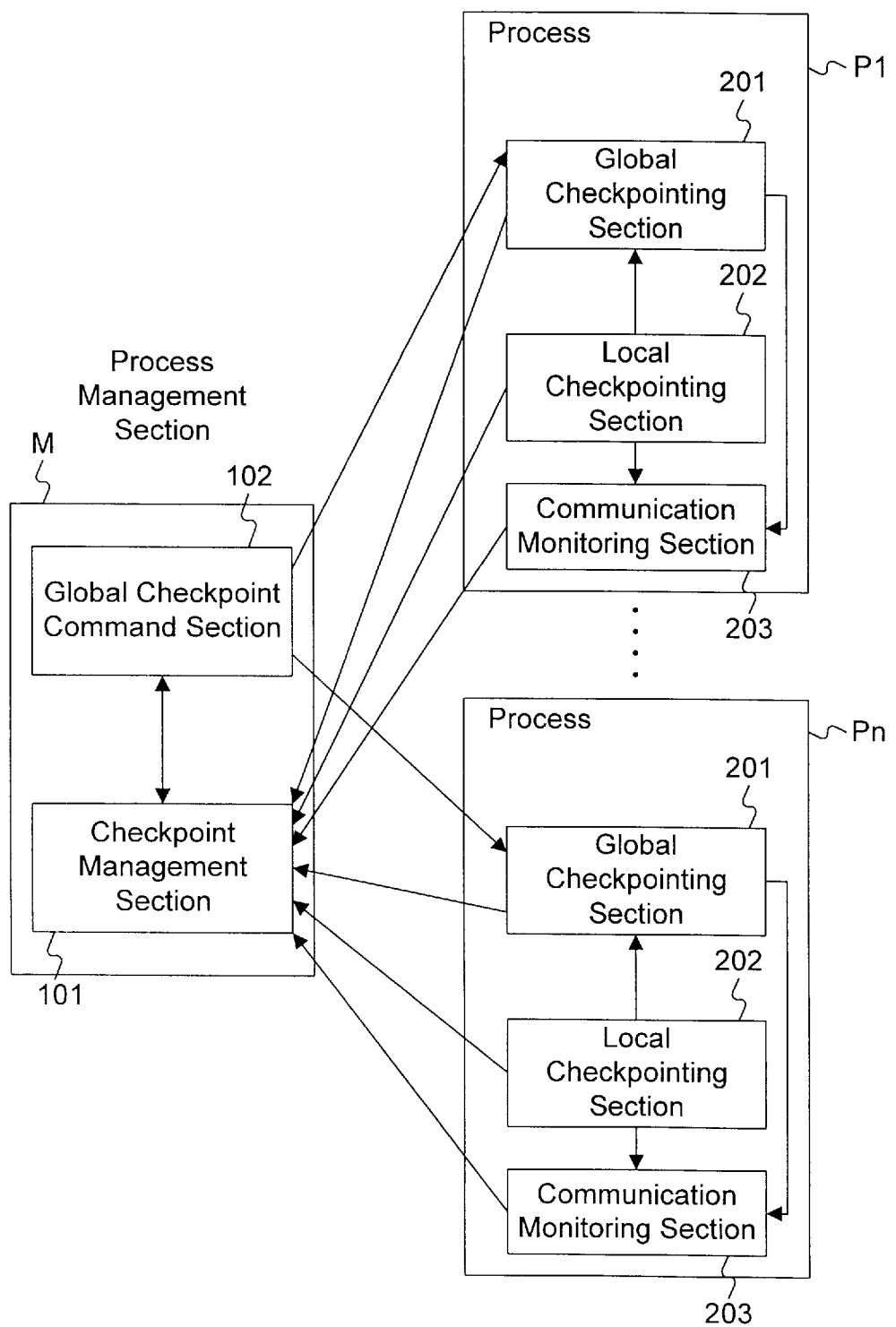
FIG. 4 is a block diagram showing a functional configuration of a distributed system consistent with the principles of the present invention.

FIG. 4 shows a functional block diagram showing a distributed system to which the above checkpointing scheme is applied. Each section may be implemented as software. This distributed system includes a plurality of computers, which operate in mutual cooperation. On any one or more of these computers, a plurality of processes P1 to Pn having mutual relationships are running. Process management section M provides the timing of global checkpointing to these relative processes P1 to Pn and determines the restart point when a fault occurs.

Process management section M may be an operating system of a distributed system, or a dedicated process independent of an operating system. It includes a checkpoint management section 101 for managing the relationships in the checkpoint group among processes P1 to Pn and for determining which checkpoint each process should be restarted from upon occurrence of a fault. Process management section M also includes a global checkpoint command section 102 for instructing the processes of a checkpoint group to perform synchronous checkpointing.

Processes P1 to Pn operate while performing inter-process communications. For checkpointing control, each of these processes includes a global checkpointing section 201, a local checkpointing section 202, and a communication monitoring section 203. Sections 201, 202, and 203 may be implemented as libraries linked to a program.

Global checkpointing section 201, in response to an instruction from global checkpoint command section 102, generates a synchronous checkpoint ("global checkpoint") which is non-contradictory to inter-process communications. Local checkpointing section 202, without reference to the timing of the synchronous checkpointing, generates a "local checkpoint" at times determined individually by each process. Local checkpointing consistent with the present invention, unlike conventional systems, does not require message logging.

The local checkpoint may be generated at intervals shorter than the interval of the global checkpointing, so that at least one local checkpoint is generated at an arbitrary time between two global checkpoints. Alternatively, local checkpointing may be performed when triggered by certain events such as an inter-process communication, irrespective of the interval of global checkpointing.

Communication monitoring section 203 monitors inter-process communications between processes for each process and informs checkpoint management section 101 in respect of monitored inter-process communications.

Checkpoint management section 101 manages which processes belong to the same checkpoint group. Global checkpoint command section 102 repeatedly issues instructions for synchronous checkpointing at an arbitrary interval based on the checkpoint group information of checkpoint management section 101. In each of processes P1 to Pn, a global checkpoint is generated by global checkpointing section 201 in response to instructions from global checkpoint command section 102, and a local checkpoint is generated by local checkpointing section 202 at an arbitrary time during global checkpointing.

These two checkpointing sections 201 and 202 notify checkpoint management section 101 and communication monitoring section 203 of the checkpointing after they have generated their checkpoints. Communication monitoring section 203, if an inter-process communication performed by each process is the first communication after the last notification of checkpointing by local checkpointing section 202 or global checkpointing section 201, notifies checkpoint management section 101 of the occurrence of the first inter-process communication.

Checkpoint management section 101, if a fault occurs, checks to see whether an inter-process communication has taken place after the most recent checkpointing by the fault process. If an inter-process communication has taken place, checkpoint management section 101 causes the entire checkpoint group to roll back to the most recently generated global checkpoint and causes it to restart from that point. If no inter-process communication has occurred, checkpoint management section 101 causes only the fault process to roll back to the most recent local or global checkpoint and causes it to restart from that point. This way, the restart time-point of each process is determined in accordance with the inter-process communication conditions related to the fault process, by combining two types of checkpointing, i.e., global and local checkpointing.

Consequently, in contrast to conventional synchronous checkpointing in which it is necessary to roll back the entire checkpoint group irrespective of whether each process is a fault process or a non-fault process, the present invention reduces the likelihood of rollback of non-fault processes because non-fault processes are not rolled back if the fault process has not performed any inter-process communication subsequent to the last checkpoint. Also, in contrast to the conventional asynchronous checkpointing, there is no need for message logging. Additionally, local checkpointing of the present invention can accommodate indeterminate processes as well as determinate processes. Furthermore, since the present invention offers a combination of global and local checkpointing, in a situation where a cascade rollback was necessary, the system can roll back to a global checkpoint instead. This is beneficial because global checkpoint rollback requires less rollback range.

Figure 5:
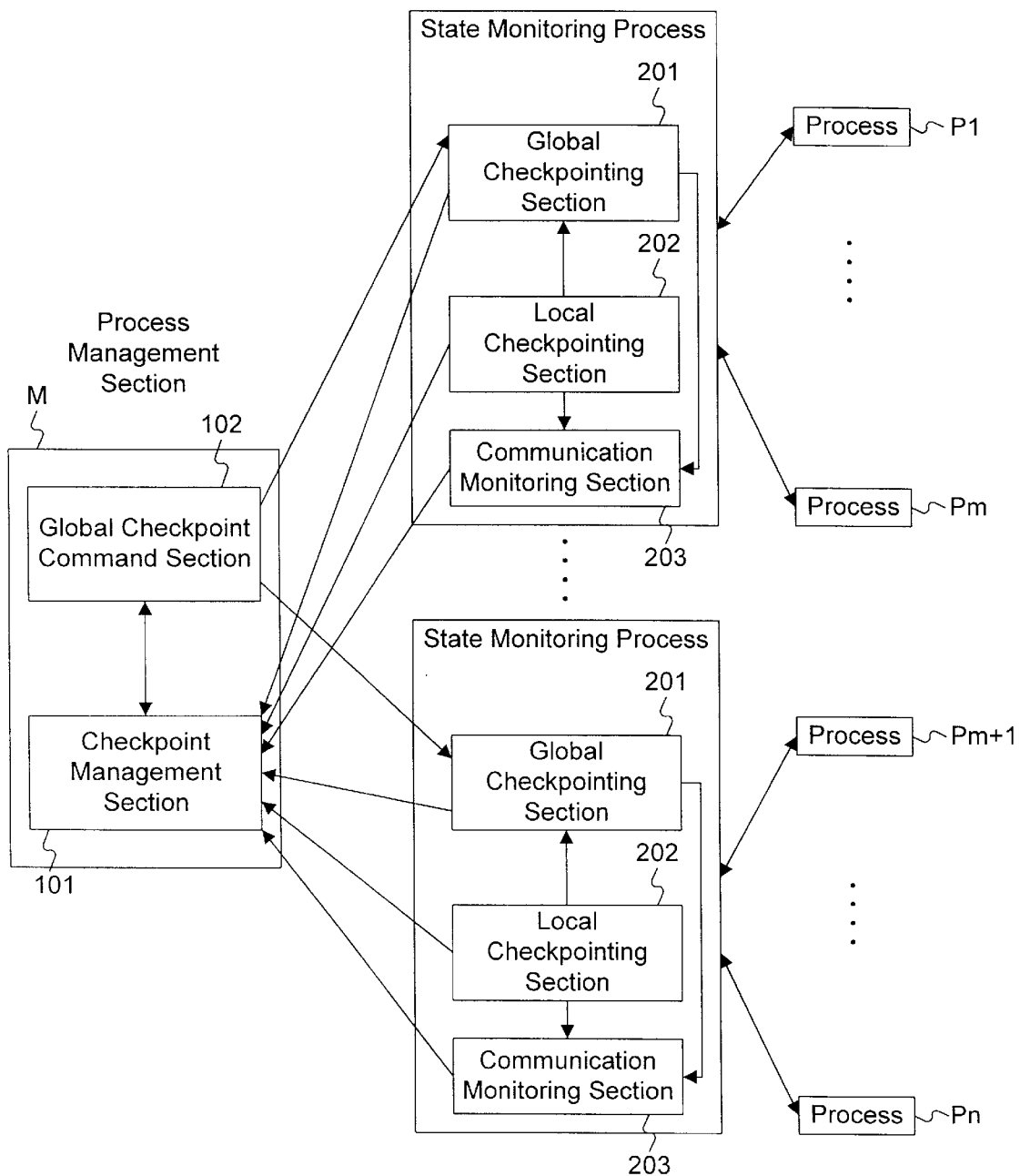
FIG. 5 is a block diagram showing a variation of the distributed system of FIG. 4.
Figure 6:
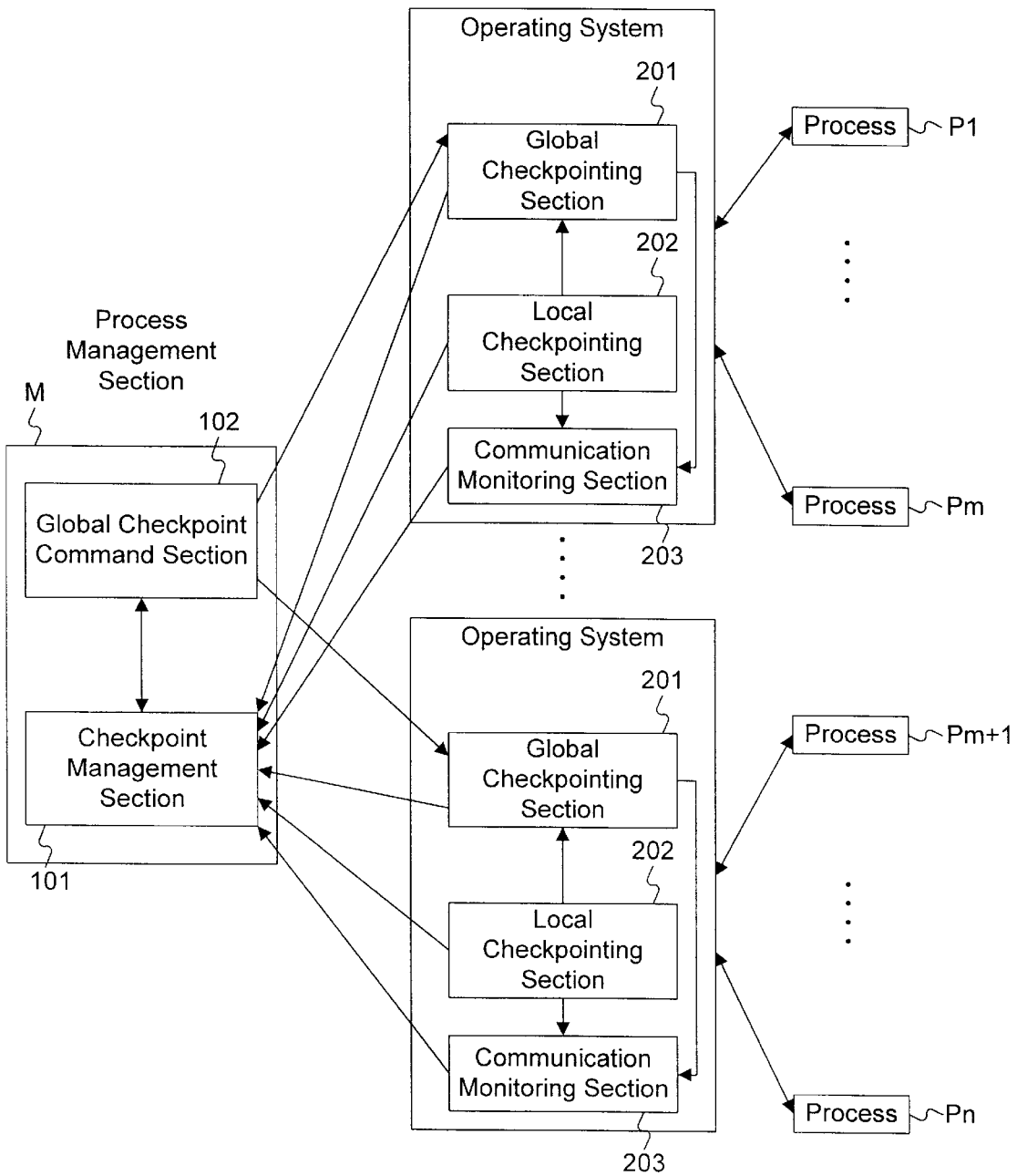
FIG. 6 is a block diagram showing another variation of the distributed system of FIG. 4.

It should be noted that global checkpointing section 201, local checkpointing section 202 and communication monitoring section 203 in FIG. 4 may be implemented as a dedicated state monitoring process or as a function in the operating system, as shown in FIGS. 5 and 6, respectively.

In FIG. 5, there is provided one state monitoring process on each computer so as to monitor states of processes on the same computer that the state monitoring process is provided in. Alternatively, the states of a plurality of processes on a plurality of computers can be monitored by a single condition monitoring process, irrespective of the configuration of the computers.

In FIG. 6, global checkpointing section 201, local checkpointing section 202 and communication monitoring section 203 are implemented within an operating system. These may be implemented as parts of the operating system code, or may be implemented as server processes in a micro-kernel type operating system. Or, they could be implemented as modules in an operating system that is capable of combining new functions as modules at run time.

Next, operations of process management section M and processes P1 to Pn will be described referring to FIGS. 7–11.

FIG. 7(a) shows exemplary checkpoint group information stored in checkpoint management section 101. Checkpoint management section 101 manages which processes belong to the same checkpoint group, using, for example, a checkpoint group table shown in FIG. 7(a). Each row of the table represents a single checkpoint group. In FIG. 7(a), processes with process IDs 100 and 89 on computer A (A:100 and A:89), a process with process ID 102 on computer B (B:102), and a process with process ID 154 on computer C (C:154) belong to a checkpoint group having group ID1. Also, processes with process IDs 193 and 200 on computer A (A:193 and A:200), a process with process ID 200 on computer B (B:200), and a process with process ID 101 on computer C (C:101) belong to checkpoint group 2.

Figure 7B:
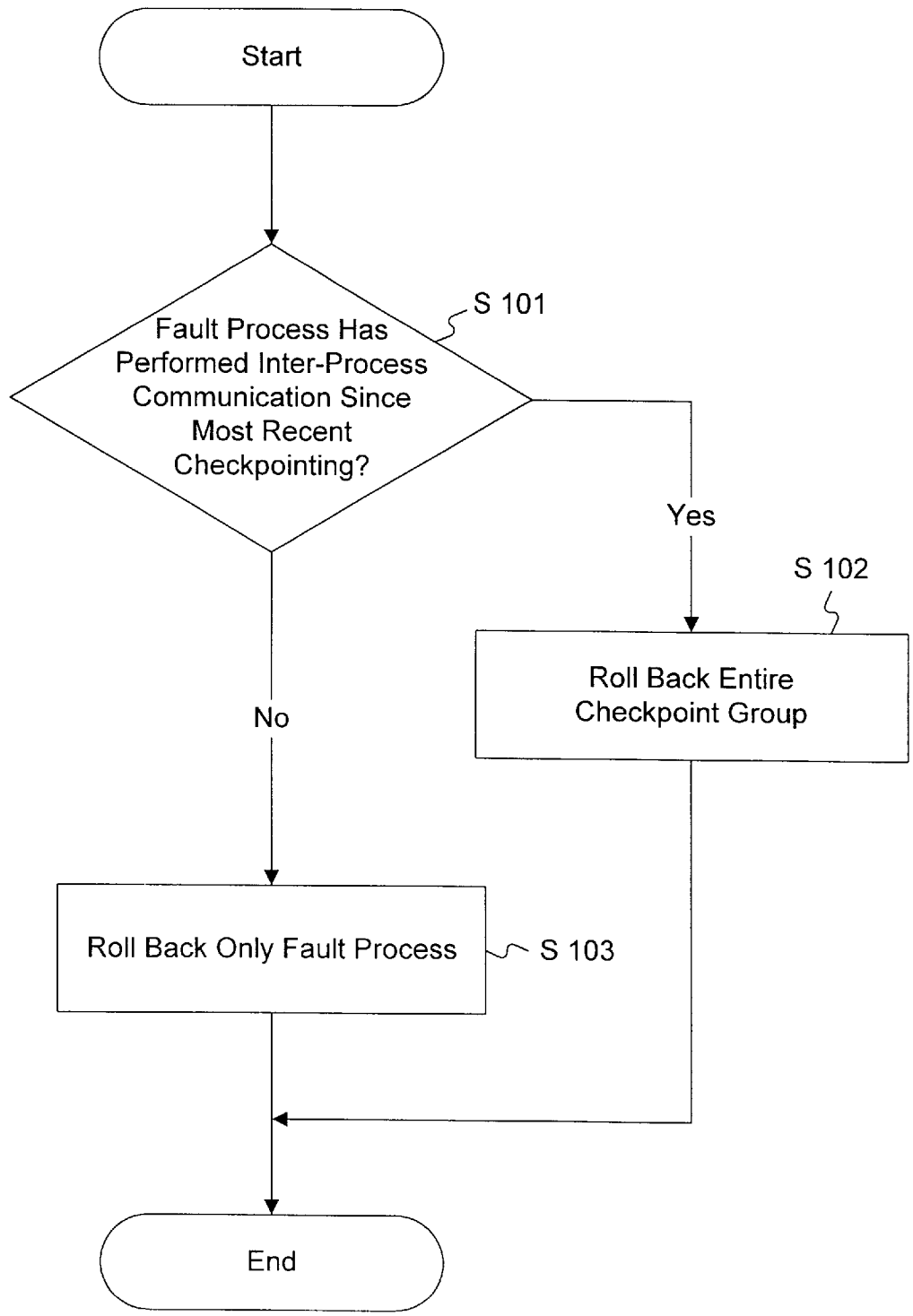

FIG. 7(b) is a flowchart explaining a procedure performed by checkpoint management section 101 when a fault occurs. Referring to FIG. 7(b), if a fault occurs in a process, checkpoint management section 101 checks to see whether this fault process has performed any inter-process communication since the most recent checkpointing of this fault process (step S101). If inter-process communication has been performed, checkpoint management section 101 decides to roll back and restart the entire checkpoint group to which the fault process belongs from the most recent global checkpoint (step S102). If not, only the fault process is restarted from its checkpoint (step S103).

FIGS. 8–11 are flowcharts showing procedures performed by global checkpoint command section 102, global checkpointing section 201, local checkpointing section 202, and communication monitoring section 203, respectively.

Figure 8:
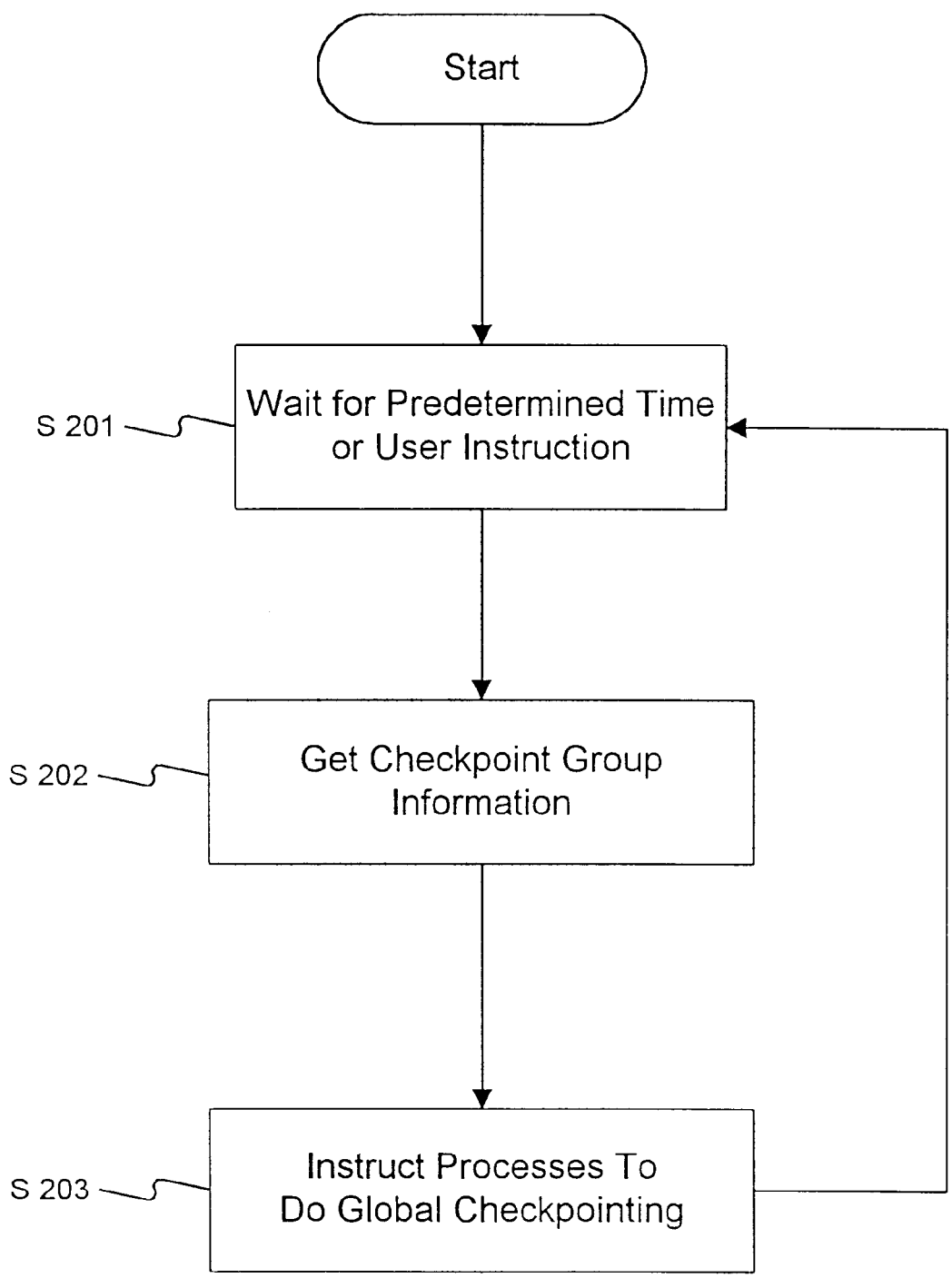
FIG. 8 is a flowchart showing a procedure performed by a global checkpoint command section.

Referring to FIG. 8, global checkpoint command section 102, after being in a standby state waiting for passage of a predetermined time period (step S201), acquires checkpoint group information from checkpoint management section 101 (step S202), and instructs global checkpointing of each process belonging to the same group (step S203). An option for a user to instruct command section 102 to issue a command to global checkpointing section 201 may also be provided. Global checkpoint command section 102 returns to step S201 and repeats the above processing.

Figure 9:
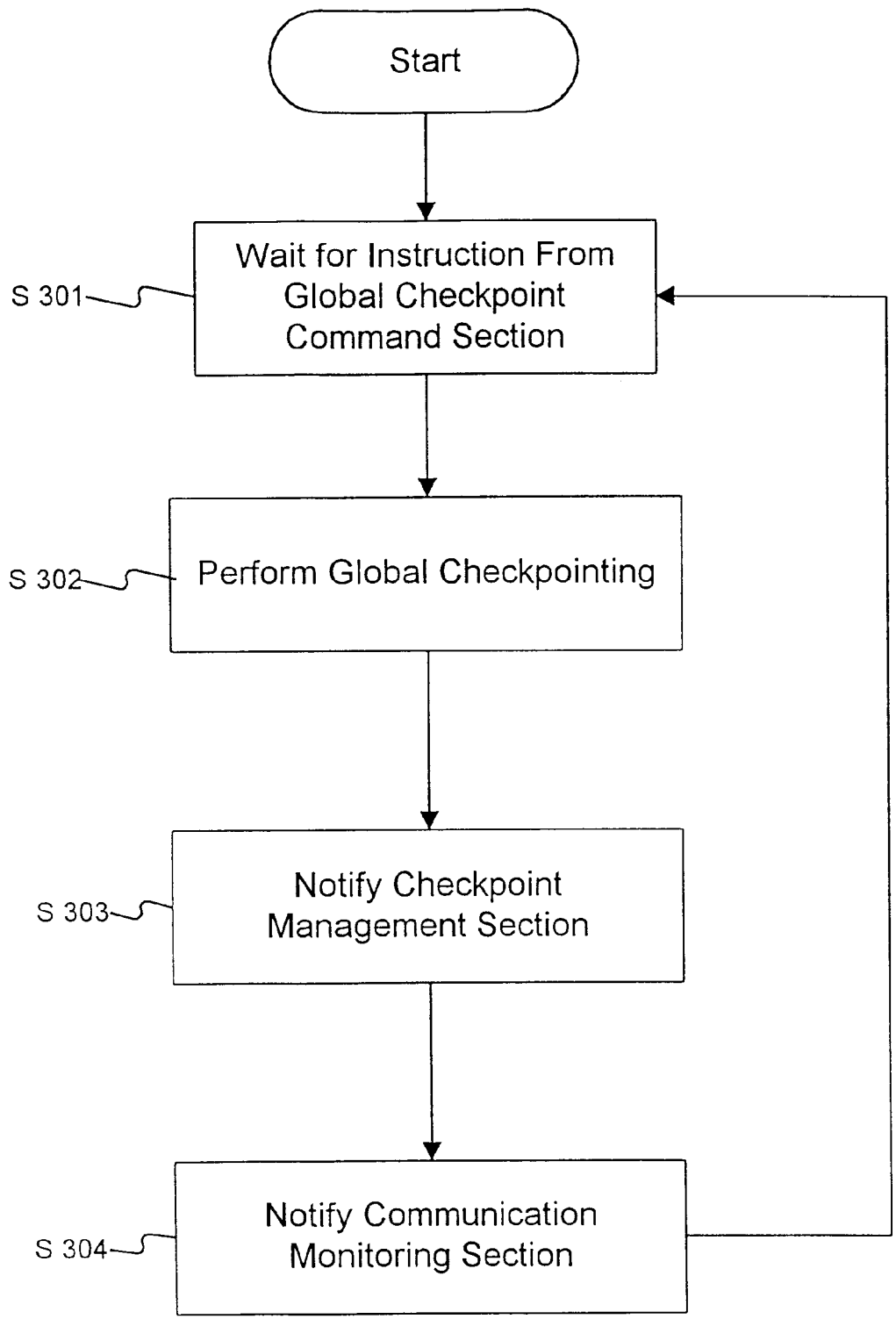
FIG. 9 is a flowchart showing a procedure performed by a global checkpointing section.

Referring to FIG. 9, global checkpointing section 201 waits for an instruction from global checkpoint command section 102 (step S301). Upon receiving the instruction, global checkpointing section 201 performs global checkpointing (step S302). It then notifies checkpoint management section 101 (step S303) and communication monitoring section 203 (step S304) that global checkpointing has been completed. Global checkpoint section 201 returns to step S301 and repeats the above process.

Figure 10:
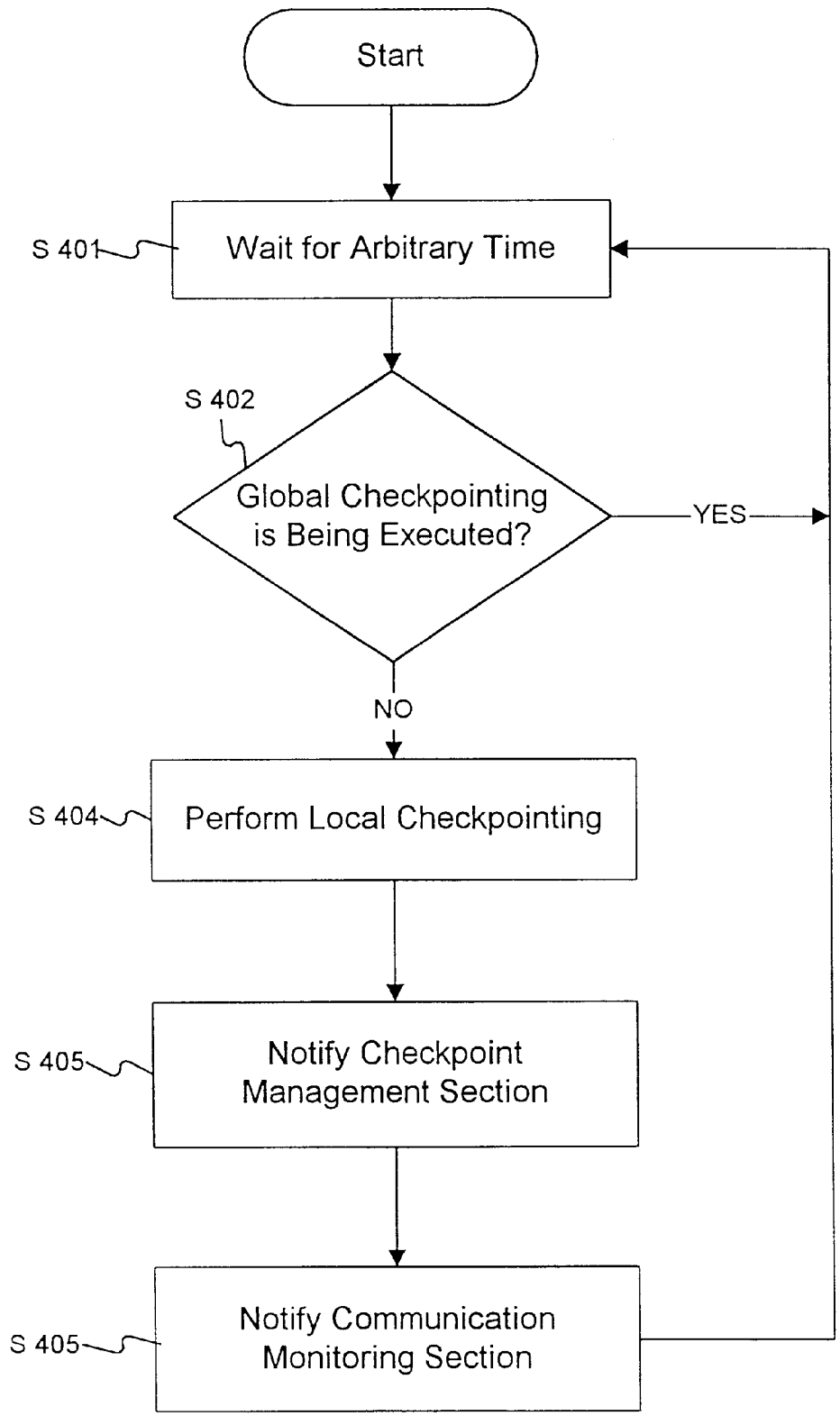
FIG. 10 is a flowchart showing a procedure performed by a local checkpointing section.

Referring to FIG. 10, local checkpointing section 202, after passage of an arbitrary time (step S401), checks whether global checkpointing section 201 is performing global checkpointing (step S402). If global checkpointing section 201 is in the process of global checkpointing, local checkpointing section 202 returns to step S401 and waits again for an arbitrary time period. If not, local checkpointing section 202 performs local checkpointing (step S403) and notifies checkpoint management section 101 (step S404) and communication monitoring section 203 (step S405) that local checkpointing has been completed. Local checkpoint section 202 returns to step S401 and repeats the above process.

Figure 11:
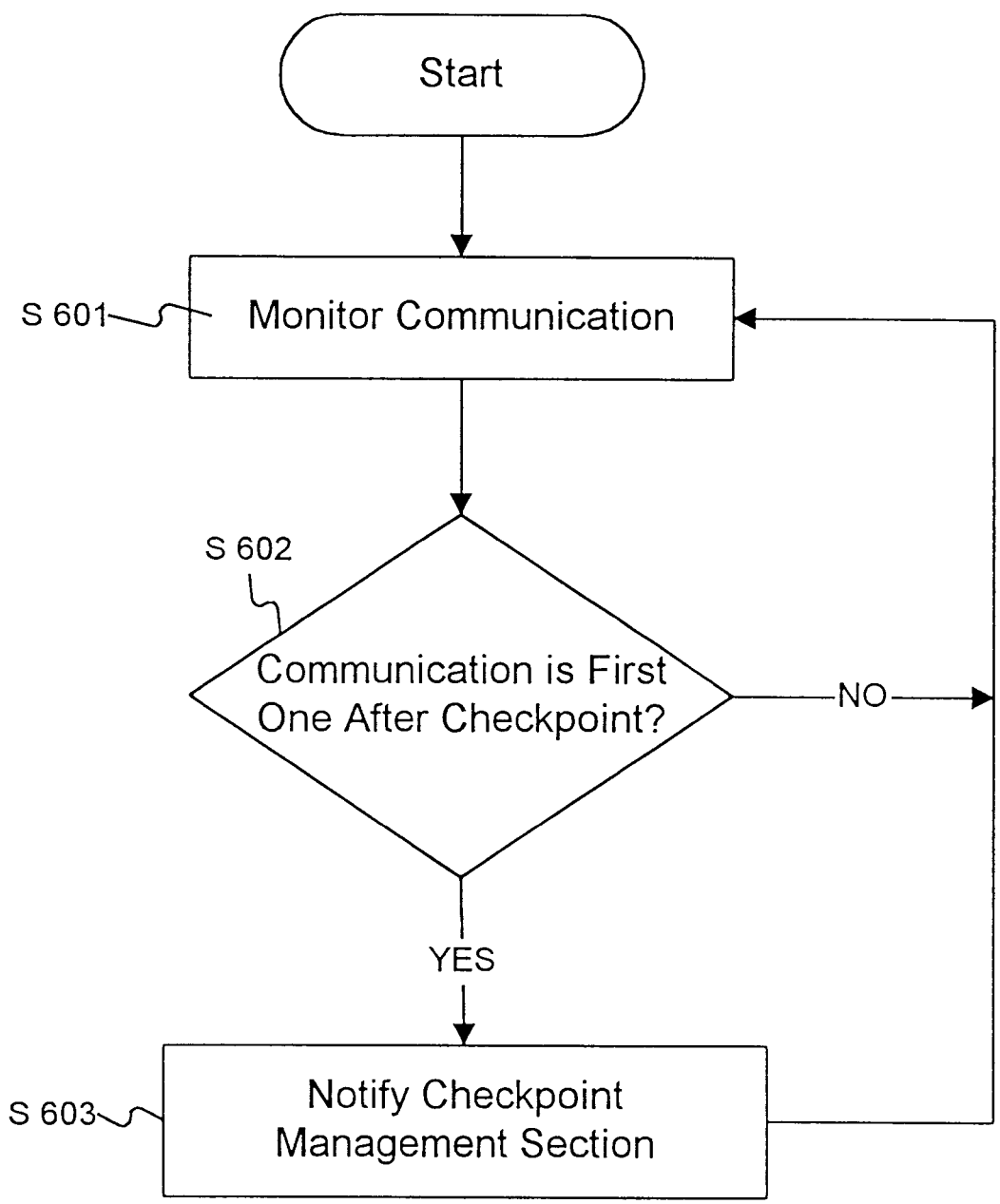
FIG. 11 is a flowchart showing a procedure performed by a communication monitoring section.

Referring to FIG. 11, communication monitoring section 203 monitors communications of the process (step S601). If the communication monitoring section 203 determines that a monitored communication is the first inter-process communication since the most recent global or local checkpointing (step S602), it notifies checkpoint management section 101 (step S603). Thereafter, communication monitoring section 203 returns to step 601. If the monitored communication is not the first inter-process communication (step S602), communication monitoring section 203 returns to step S601.

Figure 12:
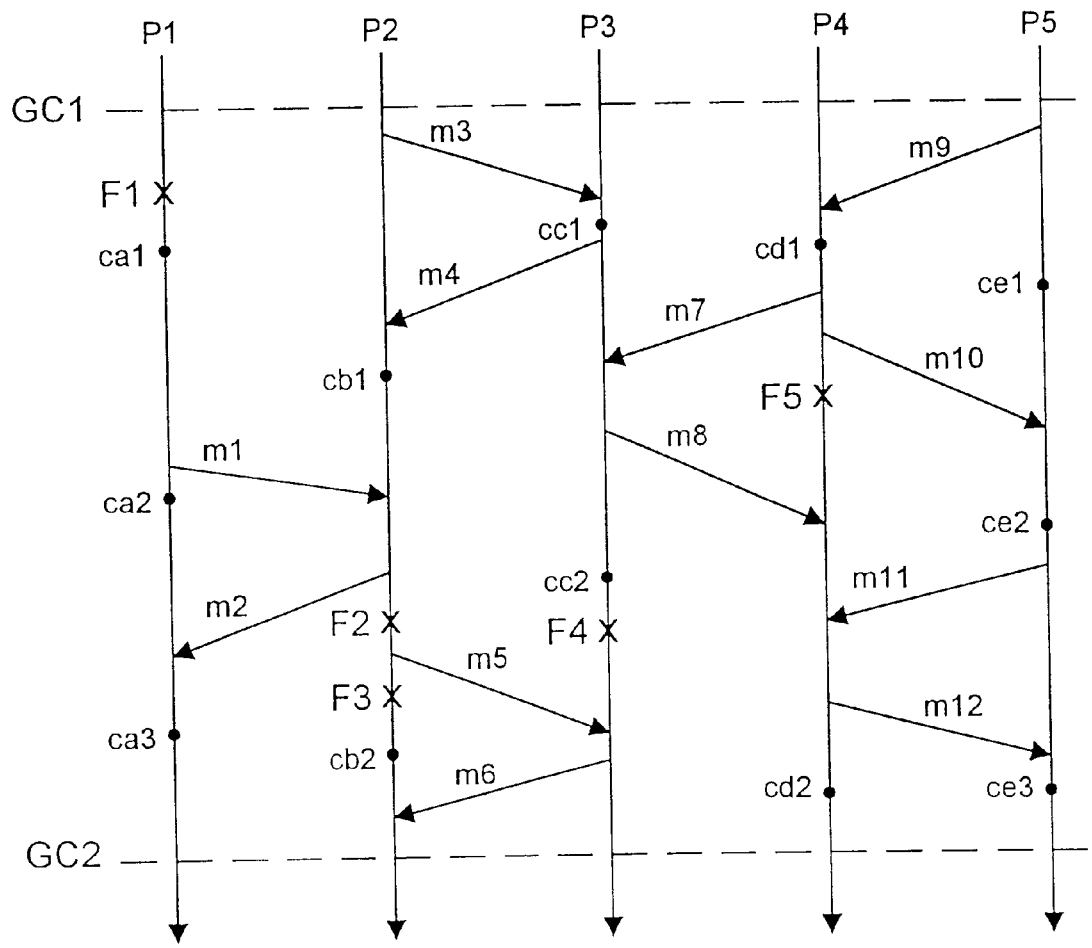
FIG. 12 is a diagram showing checkpoints and inter-process communications.

FIG. 12 is a diagram showing how checkpoints are generated in an exemplary situation in which five processes P1 through P5 are performing inter-process communications and constitute a checkpoint group. Preferably, each process performs local checkpointing at arbitrary times determined by each process between global checkpoints GC1 and GC2, by generating one or more local checkpoints. For example, between global checkpoints GC1 and GC2, process P1 generates local checkpoints ca1, ca2, and ca3; process P2 generates local checkpoints cb1 and cb2; process P3 generates local checkpoints cc1 and cc2; process P4 generates local checkpoints cd1 and cd2; and process P5 generates local checkpoints ce1, ce2, and ce3.

If a fault occurs in process P3 at time-point F4, since no communication was performed by process P3 subsequent to local checkpoint cc2, only fault process P3 is rolled back to cc2 and restarted from this point. If a fault occurs in process P2 at time-point F2, since inter-process communications have taken place with process P1 after checkpoint cb1, cb1 is invalid. Therefore, all of the processes, P1 through P5, are therefore restarted from GC1. A fault at time-point F3 or F5, just as in the case of F2, necessitates restart of the entire checkpoint group from GC1. If a fault occurs in process P1 at time-point F1, since process P1 has not performed communication after global checkpoint GC1, only process P1 is restarted from GC1.

In a second embodiment consistent with the present invention, communication monitoring section 203 preferably notifies checkpoint management section 101 of the occurrence of the first inter-process communication after checkpointing as well as occurrences of all subsequent communications. Checkpoint management section 101 stores and manages a record of communications for each process between two global checkpoints on the basis of notifications from corresponding communication management section 203. It also maintains a record of global and local checkpointing for each process on the basis of notifications from global checkpointing section 201 and local checkpointing section 202. If a fault occurs, checkpoint management section 101 uses the stored records to determine the processes to be rolled back and the optimum checkpoint to which each of these processes should be rolled back.

In the second embodiment, even if an inter-process communication has taken place after the most recent local or global checkpointing, the number of non-fault processes to be rolled back can be reduced to a minimum. Also, since the most recent valid checkpoint can be determined from the record of inter-process communications and checkpointing, the interval with which each of the fault and non-fault processes must be rolled back is decreased.

FIG. 13 shows the content of an exemplary record content of a process, including global checkpoints, local checkpoints, and inter-process communications, stored in checkpoint management section 101 for the processing shown in FIG. 12. Sending of a message is indicated by "s (message number: destination process)." Receiving of a message is indicated by "r (message number: source process)."

Figure 14:
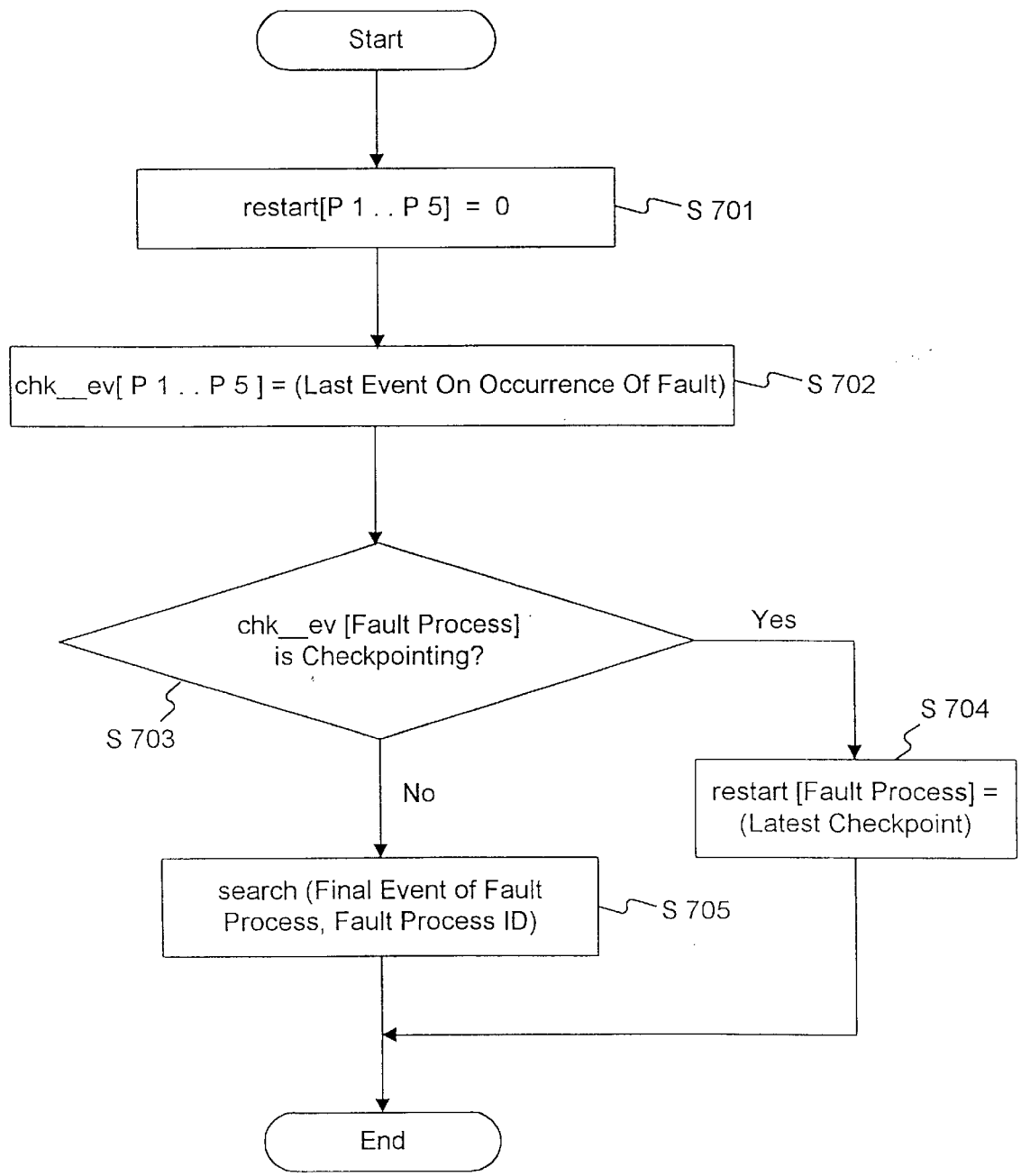
FIGS. 14(a) and 14(b) are flowcharts showing a procedure performed by the checkpoint management section for determining the restart points of the respective processes.
Figure 14B:
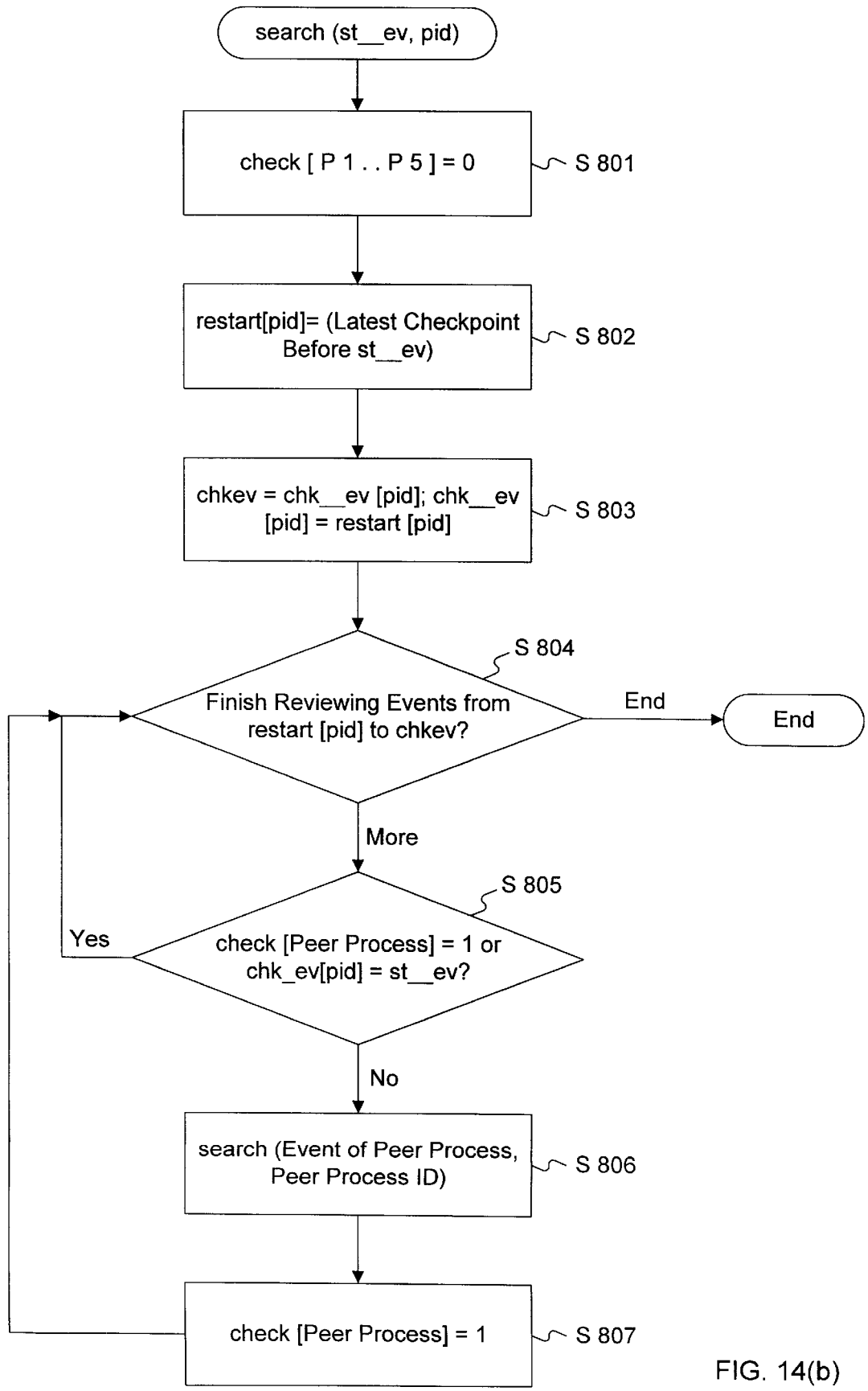

FIGS. 14(a) and 14(b) are flowcharts showing a procedure of checkpoint management section 101 for determining the restart points of the processes using the exemplary process records of FIG. 13.

As shown in FIG. 14(a), when a fault occurs, checkpoint management section 101 initializes a variable, "restart[P1 . . . P5]," to zero (step S701). The variable is for storing the restart point of each process. Checkpoint management section 101 also sets another variable, "chk_ev[P1 . . . P5]," to the last event of each corresponding process when a fault occurred (step S702). The last event of each process is stored in checkpoint management section 101 as the records.

For exemplary purposes, it is assumed that the fault process is P3, the fault time is F4 in FIG. 12, and the final event of the fault process is chk_ev[P3]. Next, checkpoint management section 101 checks whether or not chk_ev[P3] is checkpointing (step S703). If so, that implies that no communication by the fault process has occurred since the latest checkpointing. Hence, checkpoint management section 101 sets "restart [fault process]" to the most recent checkpoint of the fault process (cc2) (step S704).

If not, checkpoint management section 101 calls a function "search (st_ev, pid)," passing the final event of the fault process as "st_ev" and the process ID of the fault process as "pid" (step S705).

FIG. 14(b) shows the process of the function "search." As shown in FIG. 14(b), the function "search" initializes a variable "check[P1 . . . P5]," to zero. This variable is for indicating whether or not the communication peer-process, which is a non-fault process related to the inter-process communication from/to the fault process, has been reviewed (step S801). Then, it searches for the most recent checkpoint in the process with "pid" from the point designated by "st_ev" towards the past. The checkpoint found by the search is set to "restart [pid]" (step S802). Next, "chk_ev [pid]" is stored in "chkev" (step S803) and communication events from "restart[pid]" to "chkev" are reviewed, by varying "chk_ev[pid]." "Chk_ev[pid]" is for indicating the current last event to be reviewed in the process with "pid" (step S804).

If "check [peer process]"=1 (step S805) yields No, since it means that the peer process of the event has not yet been reviewed, checkpoint management section 101 calls the function "search" recursively to review the peer process, passing the communication event of the peer process as "st_ev" and the peer process ID as "pid" (step S806). After that, "check [peer process]" is set to 1 (step S807), and the next event is reviewed.

If "check [peer process]"=1 (step S805) yields Yes, since it implies that the peer process has been reviewed, the next event is reviewed.

If the event to be reviewed is "st_ev" (step S805, Yes), the next event is reviewed because "st_ev" need not be reviewed.

Executing the function "search" makes it possible to determine the appropriate checkpoints to which the fault process and the peer process need to be rolled back. In the above-described steps of the function "search," the variable "check" is a local variable inside the function "search," while the variable "restart" is a global variable.

The procedures shown in FIGS. 14(a) and 14(b) are explained next using the exemplary situation of FIG. 12, assuming that the fault process is P4 and the fault occurs at time-point F5. A symbolic representation of the sequence of steps executed in the processes of FIGS. 14(a) and 14(b) is provided first:

```
restart [P1 . . . P5] = 0
chk_ev = {ca1, cb1, r(m7:P4), s(m10:P5), r(m10:P4)}
<check s(m10:P5)>
search ("s(m10:P5)", P4)
        restart [P4] = chk_ev [P4] = cd1
        <check s(m7:P3)>
        search ("r(m7:P4)", P3)
                restart [P3] = chk_ev [P3] = cc1
                <check s(m4:P2)>
                search ("r(m4:P3)", P2)
                        restart [P2] = chk_ev [P2] = GC1
                        <check s(m3:P3)>
                        search ("r(m3:P2)", P3)
                                restart[P3]=chk_ev [P3] = GC1
                                return
                        return
return
<check s(m10:P5))>
        search ("r(m10:P4)", P5)
                restart [P5]=chk_ev [P5] = ce1
                return
        return
```

Next, the steps of the procedures of FIGS. 14(a) and 14(b) executed for the fault process P4 and the fault occurring at time-point FS are described in greater detail.

First, the function "restart" is initialized (restart [P1 . . . P5]=0) (step S701). Next, the last events of processes P1 to P5 upon occurrence of a fault are stored in chk_ev (step S702). Thereafter, the function "search" is executed taking as parameters the final event of fault process P4 before time-point F5 and the process ID of the fault process (search ("s(m10:P5)",P4)) (step S705).

Next, restart [P4]=chk_ev [P4]=cd1 is set (step S802), and then the function "search" is recursively called (search ("r(m7:P4)",P3), taking as parameters the event (r(m7:P4)) corresponding to process P3, which is the peer process for message m7, and process ID (P3) (step S806).

Next, the most recent checkpoint (cc1) from the time-point when process P3 received m7 is set to restart [P3] and chk_ev [P3] (restart [P3]=chk_ev [P3]=cc1) (step S802).

Then, among the events from cc1 up to the reception of m7 which is the last event of process P3, for the unchecked message m4, the function "search" is recursively called (search ("r(m4:P3)", P2)), taking as parameters the corresponding event (r(m4:P3)) of the communication party process P2, and the process ID (P2) of this process P2 (step S806).

After that, the most recent checkpoint (GC1) from the time-point when process P2 received m4 is set to restart [P2] and chk_ev [P2] (restart [P2]=chk_ev [P2]=GC1) (step S802).

Next, as an event during the period from GC1 up to cb1 which is the last event of process P2, for the unchecked message m3, the function "search" is recursively called (search ("r(m3:P2)", P3)), taking as parameters the corresponding event ("r(m3:P2)) of the communication party process P3, and the process ID (P3) of this process P3 (step S806).

Then, the most recent checkpoint (GC1) before the time-point when process P3 has received m3 is set to restart [P3] and chk_ev [P3] (restart [P3]=chk_ev [P3]=GC1) (step S802).

As described above, all the checking for message m7 relating to fault process P4 has been completed. Next, checking in respect of message m10 is performed.

Namely, the function "search" is recursively called (search ("r(m10:P4)", P5)) using as parameters the corresponding event ("r(m10:P4)) of communication party process P5 and the process ID (P5) of this process P5 (step S806).

Then, the most recent checkpoint (ce1) before the time-point when process P5 received m10 is set to restart [P5] and chk_ev [P5] (restart [P5]=chk_ev [P5]=ce1) (step S802).

The last event of process P5 is receipt of m10, so further checks are not performed.

In this way, checking for all the processes within the range affected by inter-process communications performed subsequent to the most recent checkpoint of the fault process is carried out in sequence. The checking is done up to the checkpoint to which each of these processes is to be rolled back, from the latest event (communication or checkpointing) which is performed by each of these processes before the fault occurrence.

As a result of the above processing, the restart points of processes P1, P2, P3, P4 and P5 are obtained as (0, GC1, GC1, cd1, ce1). Namely, if a fault occurred in process P4 at F5, processes P2, P3, P4 and P5 are restarted respectively from GC1, GC1, cd1 and ce1 without rolling back process P1.

As described above, by using the record of inter-process communications and checkpointing of processes P1 through P5 belonging to the checkpoint group for which a distributed checkpointing is performed, a valid checkpoint can be determined for each process. Thus, each optimum checkpoint to which each of the processes should be rolled back can be determined. In this way, even if the most recent checkpoint of the fault process is invalid, it is not necessary to roll back all of the processes to the global checkpoint, and therefore the number of processes to be rolled back is minimized and the range of rollback is reduced.

It is to be noted that the above described embodiments according to the present invention may be conveniently implemented using a conventional general purpose digital computer programmed according to the teachings of the present specification, and that appropriate software coding can readily be prepared by skilled programmers based on the teachings of the present disclosure, as will be apparent to those skilled in the computer art.

For example, it is readily possible to provide a computer system which is equipped with executing means such as a CPU and a memory for running a plurality of processes P1 through Pn of FIGS. 4, 5, and 6. Then, computer programs realizing process management section M (as a checkpointing manager), global checkpointing section 201, local checkpointing section 202, and communication monitoring section 203 can be installed into this computer system, and this computer system can be operated to execute the procedures according to the flowcharts of FIGS. 7(b)–11 or FIGS. 14(a)

and 14(b). In this manner, the distributed system of FIGS. 4, 5, and 6 can be implemented as a software package installed on a general purpose computer system in practice. It is also possible to provide some separate software packages corresponding to the checkpointing manager, global checkpointing section, local checkpointing section, and communication monitoring section, respectively.

Such a software package can be a computer program product which employs a storage medium including stored computer code which is used to program a computer to perform the disclosed function and process of the present invention. The storage medium may include, but is not limited to, any type of conventional floppy discs, optical discs, CD-ROMs, magneto-optical discs, ROMs, RAMs, EPROMs, EEPROMs, magnetic or optical cards, or any other suitable media for storing electronic instructions.

In addition to those already mentioned above, persons of ordinary skill will realize that many modifications and variations of the above embodiments may be made without departing from the novel and advantageous features of the present invention. Accordingly, all such modifications and variations are intended to be included within the scope of the appended claims.

The specification and examples are only exemplary. The following claims define the true scope and sprit of the invention.

What is claimed is:

1. A method for checkpointing for a plurality of processes performing inter-process communication, the method comprising the steps of:

monitoring the inter-process communication for each of the processes;

generating a global checkpoint for each of the processes by synchronizing the checkpointing of the processes;

generating a local checkpoint, independently from the generation of the global checkpoint, at an arbitrary time determined respectively for each of the processes; and rolling back at least one of the processes to one of the global and local checkpoints determined based on the monitored inter-process communication when a fault occurs.

2. The method according to claim 1, wherein any one of the processes in which a fault has occurred is a fault process, and wherein the monitoring step includes the step of checking whether the fault process has performed inter-process communication since a most recent one of the global and local checkpoints in the fault process.

3. The method according to claim 2, wherein the rolling back step includes the step of determining to roll back only the fault process to a most recent checkpoint in the fault process, when the checking indicates that the fault process has performed no inter-process communication since the most recent checkpoint.

4. The method according to claim 2, wherein the rolling back step includes the step of determining to roll back the processes to the respectively corresponding global checkpoints, when the checking indicates that the fault process has performed inter-process communication since the most recent checkpoint in the fault process.

5. The method according to claim 1, further comprising the step of storing a record of the monitored inter-process communication and of the generated global and local checkpoints for each of the processes.

6. The method according to claim 5, wherein the rolling back step includes the step of determining processes to be rolled back and appropriate checkpoints to which each of the processes is to be rolled back, based on the stored record.

7. The method according to claim 6, wherein the determining step includes the step of determining to roll back only a fault process in which the fault has occurred to a most recent one of the global and local checkpoints in the fault process, when the stored record indicates that the fault process has performed no inter-process communication since the most recent checkpoint.

8. The method according to claim 6, wherein the determining step includes the step of determining, when the stored record indicates that a fault process in which the fault has occurred has performed inter-process communication since the most recent one of the global and local checkpoints in the fault process, to roll back to the appropriate checkpoints the processes on which the inter-process communication performed by the fault process had an effect, based on the stored record.

9. The method according to claim 6, wherein the determining step includes the step of determining the appropriate checkpoints such that the rolled back processes can be restarted without a contradiction.

10. The method according to claim 6, wherein the determining step includes the step of limiting the appropriate checkpoints to a most recent global checkpoint.

11. The method according to claim 1, further comprising the step of restarting the at least one process from the global or local checkpoint to which it is rolled back.

12. A computer system, comprising:

means for executing a plurality of processes performing inter-process communication;

means for monitoring the inter-process communication for each of the processes;

means for generating a global checkpoint for each of the processes by synchronizing the checkpointing of the processes;

means for generating a local checkpoint independently from the generation of the global checkpoint, at an arbitrary time determined respectively for each of the processes; and means for rolling back at least one of the processes to one of the global and local checkpoints determined based on the monitored inter-process communication when a fault occurs.

13. An article of manufacture, comprising:

a computer-usable medium having computer-readable program code means embodied therein for causing a computer to function as a checkpointing manager for managing checkpointing for a plurality of processes performing inter-process communication, the computer-readable program code means including:

first computer- readable program code means for causing the computer to receive a result from monitoring the inter-process communication for each of the processes;

second computer readable program code means for causing the computer to command to generate a global checkpoint for each of the processes for synchronizing the checkpointing of the processes;

third computer readable program code means for causing the computer to receive information of a local checkpoint for each of the processes, the local checkpoint being generated independently from the generation of the global checkpoint with a timing determined respectively for each of the processes; and fourth computer readable program code means for causing the computer to determine to roll back at least one of the processes to one of the global and local checkpoints based on the result of the monitoring, when a fault occurs.

* * * * *